(12) United States Patent
Le Tinnier et al.

(10) Patent No.: US 8,641,116 B2
(45) Date of Patent: Feb. 4, 2014

(54) ARTICLE TO FIX ON A SUPPORT PROVIDED WITH AN OPENING AND ASSIST GRIP HANDLE COMPRISING IT

(75) Inventors: Christophe Le Tinnier, Cauffry (FR); Emmanuel Ledent, Tessancourt (FR); Laurent Sanchez, Nanterre (FR)

(73) Assignee: I.T.W. de France, Beauchamp (FR)

( * ) Notice: Subject to any disclaimer, the term of this patent is extended or adjusted under 35 U.S.C. 154(b) by 42 days.

(21) Appl. No.: 13/148,396

(22) PCT Filed: Feb. 4, 2010

(86) PCT No.: PCT/IB2010/050521
§ 371 (c)(1),
(2), (4) Date: Aug. 8, 2011

(87) PCT Pub. No.: WO2010/089709
PCT Pub. Date: Aug. 12, 2010

(65) Prior Publication Data
US 2011/0309648 A1    Dec. 22, 2011

(30) Foreign Application Priority Data
Feb. 9, 2009   (FR) ..................................... 09 50786

(51) Int. Cl.
*B60N 3/02*    (2006.01)

(52) U.S. Cl.
USPC ............................ 296/1.02; 16/110.1; 16/429

(58) Field of Classification Search
USPC ................................ 296/1.02; 16/110.1, 429
See application file for complete search history.

(56) References Cited

U.S. PATENT DOCUMENTS

| 2005/0091798 A1 | 5/2005 | Belchine, III et al. |
| 2007/0102944 A1* | 5/2007 | Kato et al. ................... 296/1.02 |
| 2008/0066266 A1 | 3/2008 | Scroggie et al. |

FOREIGN PATENT DOCUMENTS

| EP | 1527947 A2 | 5/2005 |
| WO | 02/062616 A1 | 8/2002 |
| WO | 2008/033667 A1 | 3/2008 |

OTHER PUBLICATIONS

Search Report results for French Application No. 0950786 dated Sep. 22, 2009.
ISR for PCT/IB2010/050521 dated May 26, 2010.

* cited by examiner

*Primary Examiner* — Glenn Dayoan
*Assistant Examiner* — Melissa A Black
(74) *Attorney, Agent, or Firm* — Lowe Hauptman & Ham, LLC

(57) ABSTRACT

The article comprises a part comprising two lugs for snap-fastening said part on a support and two abutment means for bearing against that support. The part also comprises a body, provided with an aperture, to which are attached the lugs as well as a fixing foot adapted to be disposed through the aperture. The article has a locked configuration in which the fixing foot blocks said lugs in said snap-fastening position and an unlocked configuration in which said foot is adapted to be inserted and extracted from said part and in that said article further comprises quarter turn fixing means to make the article pass between said locked configuration and unlocked configuration.

9 Claims, 3 Drawing Sheets

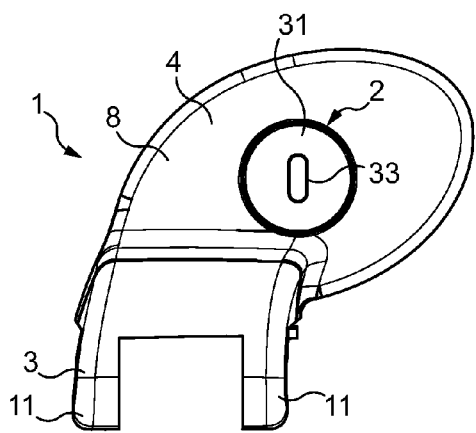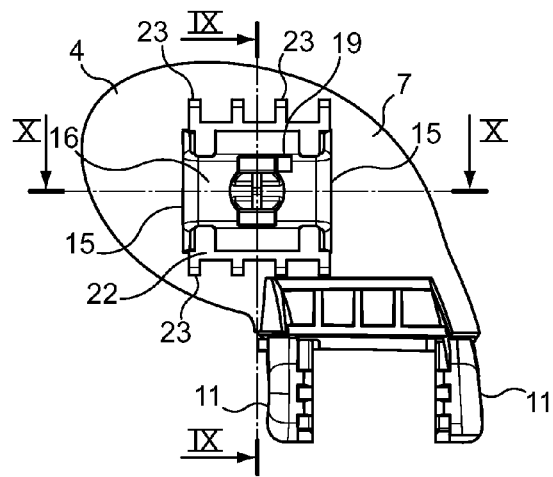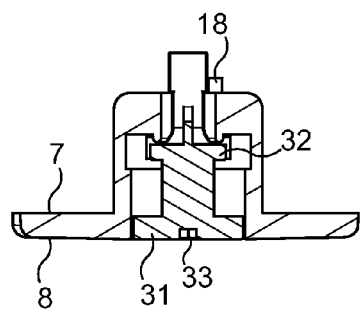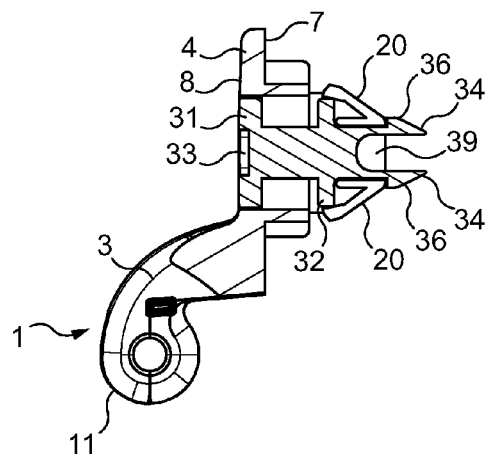

ARTICLE TO FIX ON A SUPPORT PROVIDED WITH AN OPENING AND ASSIST GRIP HANDLE COMPRISING IT

RELATED APPLICATIONS

The present application is national phase of PCT/IB2010/050521 filed Feb. 4, 2010, and claims priority from French Application Number 0950786 filed Feb. 9, 2009.

The present invention concerns handles disposed in an automotive vehicle above the side windows and more particularly the articles belonging to those handles and which enable them to be fixed to the sheet metal of the automotive vehicle.

Such an article to fix to a support provided with an opening of predetermined contour is known from the document EP 1 527 947. The article comprises a part and a fixing foot. The part is provided with two lugs for snap-fastening the part on the support and comprises two abutment means for bearing against the support in a snap-fastening position of the part on the support. Each abutment means faces a respective lug. The part further comprises a body to which the lugs are attached and which comprises the abutment means. The body is provided with an aperture of predetermined contour opening between the lugs. The fixing foot is pushed in by pressing on its head so as to place it through the aperture of the body.

The article has a locked configuration in which the fixing foot blocks the lugs in the snap-fastening position of the part.

This article is satisfactory in enabling the snap-fastening lugs to be moved away from each other by means of the foot.

The object of the invention is to provide an article of the same kind having such a locking configuration as well as an unlocking configuration while remaining particularly simple and convenient to install.

To that end, the invention provides an article to fix on a support provided with an opening of predetermined contour, comprising:
  a part comprising:
    two lugs for snap-fastening said part on said support,
    two abutment means for bearing against said support in a snap-fastening position of said part on said support, each respective said abutment means facing a respective said lug, and
    a body to which said lugs are joined and which comprises said abutment means, said body being provided with an aperture of predetermined contour opening between said lugs; and
  a fixing foot adapted to be disposed through the aperture of said body,
said article being adapted to adopt a locked configuration in which said fixing foot is disposed in said aperture and blocks said lugs in said snap-fastening position of said part, characterized in that said article is also adapted to adopt an unlocked configuration in which said foot is adapted to be inserted and extracted from said part and in that said article further comprises quarter-turn fixing means to make said article pass between said locked and unlocked configurations.

In its unlocked configuration, the article is ready to be fixed to the sheet metal. It suffices to snap fasten the snap-fastening lugs onto the parameter of the opening in the sheet metal. As the foot is already fully inserted into the part, it is made to undergo a rotation through a quarter of a turn to bring the article into its locked configuration. The article is then fixed to the sheet metal. If it is necessary to demount the article, it suffices to perform a rotation of the foot through a quarter of a turn in the opposite direction such that the snap-fastening lugs are no longer blocked in their snap-fastening position and the article can be withdrawn from the sheet metal without damaging the different parts constituting the article.

According to features of implementation that are particularly simple and convenient both with respect to manufacture and use:
  each said snap-fastening lug of said part is flexible and comprises a ramp and a reentrant portion disposed at the end of said ramp;
  the free end of said body is planar and has on the perimeter of said aperture a rotation abutment belonging to said quarter turn fixing means;
  said fixing foot comprises a shank, a first plate, which is circular, disposed at a first end of said shank, a second plate, which is oblong, disposed at an opposite second end of said shank to said first plate, two snap-fastening tabs emerging from said second plate, said second plate belonging to said quarter-turn fixing means and one of said tabs coming into abutment against said abutment when said article is in said locked configuration;
  the largest dimension of said second plate is equal to the diameter of said first plate and matches the diameter of said aperture on the opposite side to said lugs;
  each said lug has at its free end an edge, said edges being parallel and separated from each other by a distance less than the diameter of the aperture on the opposite side to said lugs in said unlocked configuration, the separation between said edges being greater in said locked configuration;
  said first plate comprises a cut-out adapted to receive a tool for rotation of said foot;
  said part further comprises a plate from one side of which said body emerges and from the other side of which emerges a handle base comprising hinging and mounting means for a segment of a handle.

The invention also provides an assist grip handle for an automotive vehicle, characterized in that it comprises two said articles as described above as well as a handle segment of which the two ends are each hingingly mounted on a said respective article.

The features and advantages of the invention will appear from the following description, given by way of preferred but non-limiting example, with reference to the accompanying drawings in which:

FIG. 7 is an elevation view of the article according to the invention in its locked configuration;

Figure 1:
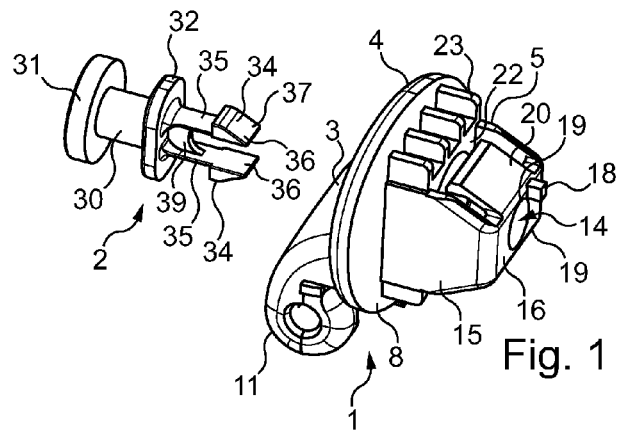
FIG. 1 is an exploded perspective view of an article according to the invention; the foot presenting the orientation of the locked configuration.
Figure 3:
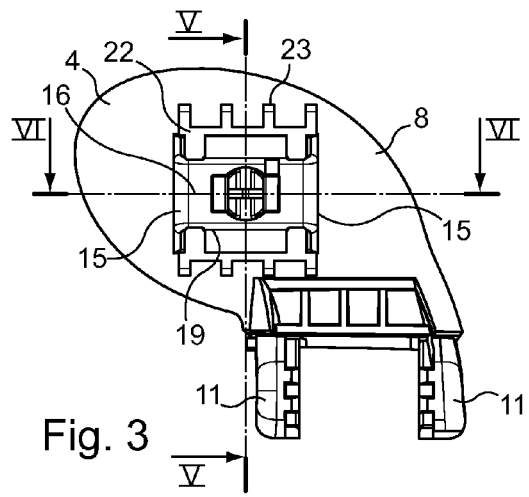
FIG. 3 is a view from below of the article of FIG. 1 mounted in its unlocked configuration.
Figure 6:
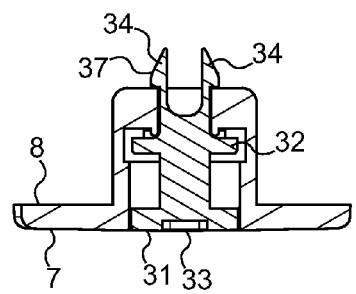
FIG. 6 is a section view of the article on the plane referenced VI-VI in FIG. 3.
Figure 4:
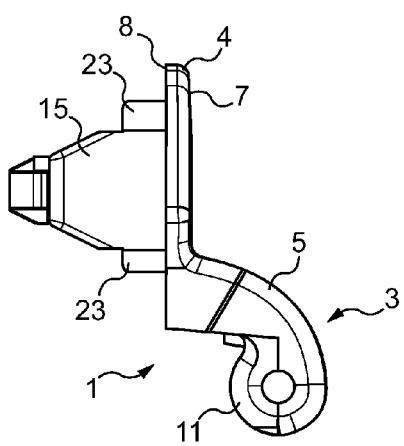
FIG. 4 is an elevation view of that article taken as seen by an observer positioned on the right of FIG. 3.
Figure 5:
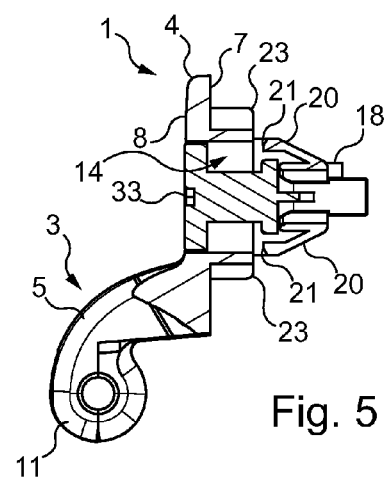
FIG. 5 is a section view of the article on the plane referenced V-V in FIG. 3.
Figure 11:
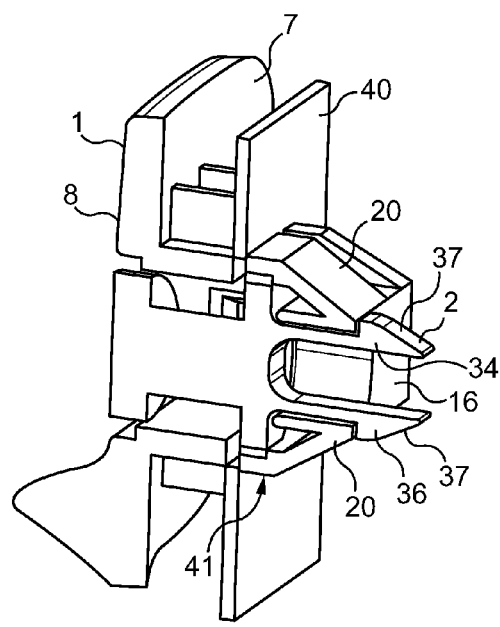

FIGS. 8 to 10 respectively corresponding to FIGS. 3, 5 and 6 in the locked configuration of the article according to the invention; and FIG. 11 is a section view of the article in perspective in its locked configuration on the plane referenced IX-IX in FIG. 8.

The article to fix on a support or on sheet metal comprises a part 1 and a fixing foot 2. The part 1 and the foot 2 are each formed from plastics material molded in one piece.

Part 1 comprises a handle base 3, a plate 4 and a body 5.

The plate 4 is a thin planar plate of oval general shape.

Plate 4 has an outer surface 7 and an inner surface 8. The handle base 3 emerges from the outer surface 7 thereof. Base 3 is has the general shape of a U with, on each side of a main part linked to the plate 4, two ears 11.

Each ear 11 is thin and has a circular general profile with an opening that is also circular situated at the center thereof.

The ears 11 provided in particular with their circular aperture form means for mounting and rotation for a segment 12 of an assist grip handle for example for automotive vehicles. The segment 12 is rotatably mounted in the ears 11 with the help of a cylindrical journal not shown.

Figure 2:
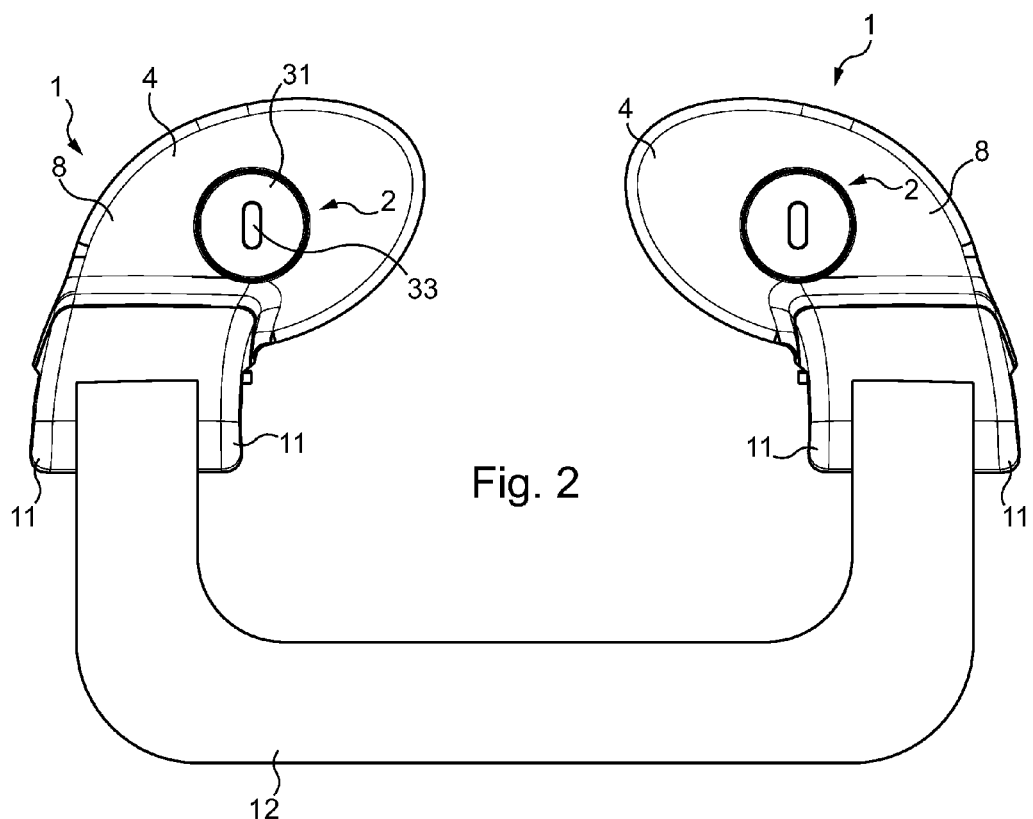
FIG. 2 is a perspective view of a handle according to the invention, comprising two articles of FIG. 1.

In FIG. 2, an automotive vehicle handle comprising two parts 1 and a segment 12 have been represented. The two parts 1 are the minor image of each other and are disposed away from each other such that branch 12 which has ends that extend transversely to the general direction of the segment is able to be mounted into the two parts 1 and, more particularly, in order for the two ends to be able to be mounted onto the ears 11.

The body 5 emerges from the inner surface 8, on the other side of the plate 4.

The plate 4 and the body 5 comprise a circular through-aperture 14. The aperture 14 extends transversely to the main plane in which the plate 4 extends. The aperture 14 comprises a first portion adjacent the plate 4 and over a part of the body 5. This first portion (away from the lugs 20) is of a specific diameter. Towards its opposite end to the plate 4, the aperture 14 comprises a second portion of smaller diameter such that there is a re-entrant portion between the two portions.

The body 5 includes a U-shaped structure comprising two lateral walls 15 disposed away from each other and transversely to the plate 4. These two walls 15 corresponding to the vertical arms of a U. These two walls 15 are tapered towards their end that is remote from the plate 4 and are connected at those ends to each other by a rectangular back wall 16 which comprises a circular opening at its center from which issues the second portion of the circular aperture 14.

Each lateral wall 15 comprises a rectangular portion followed by a trapezoidal portion with the non-parallel edges of that trapezoidal portion converging towards the end of the wall 15 that is remote from plate 4.

On its free surface, the back wall 16 comprises a parallel-epiped projection 18 which is disposed on the perimeter of the aperture 14.

The back wall 16 has two parallel edges 19, those edges 19 each extending from one to the other of the lateral walls 15. A snap-fastening lug 20 emerges from each of those edges 19 for the snap-fastening of part 1 and more generally of the article onto sheet metal of a vehicle.

Each lug 20 is a rectangular plate molded in one piece with the rest of part 1. The surface of the lugs 20 that is disposed outwardly of part 1 forms a snap-fastening ramp.

The lugs 20 are oriented parallel to the non-parallel edges of the trapezoidal portions of the lateral walls 15. The lugs 20 extend towards plate 4 over a distance approximately corresponding to the length of the non-parallel edges of the trapezoidal portions of the lateral walls 15.

Each lug 20 comprises a free edge 21 disposed away from the back wall 16 and parallel thereto.

Between the lateral walls 15 directly against the inner surface 8 of the plate 4 there extends a region 22 of increased thickness of rectangular general shape which in width extends between the two lateral walls 15 and in length extends beyond each lateral wall 15 on each side.

On its lateral walls that are transverse to the lateral walls 15, the region 22 of increased thickness comprises on each side four reinforcing projections 23 of which the free corner is cut off. The center of the region of increased thickness is pierced by the aperture 14.

The fixing foot 2 comprises a shank 30, a circular plate 31 disposed at one end of the shank 30 and an oblong plate 32 disposed at the other end of the shank 30.

The foot 2 also comprises two snap-fastening tabs 34 for snap-fastening the fixing foot 2 to the part 1.

The plate 31, 32 are planar and of small thickness. The shank 30 is cylindrical and has a diameter less than the first diameter of the aperture 30.

At its greatest width, the dimension of the oblong plate 32 is of dimension equal to the diameter of the first portion of the aperture 14 and to the diameter of the circular plate 31 such that plate 32 occupies less space than plate 31.

The tabs 34 emerge from plate 32 on the opposite side to shank 30. Each tab 34 comprises a shaft forming base 35 and a wedge 36 tapering towards the free end of each tab 34. The bases 35 are rounded and comprise outer cylindrical surfaces such that the two bases are encompassed in a cylinder of equal diameter to the diameter of the first portion of the aperture 14.

Each wedge 36 comprises a ramp forming surface 37 which at its opposite end to the free end terminates with a re-entrant portion joining the wedge 36 to the base 35. The two tabs 34 are spaced away from each other and disposed transversely to plate 32. A reinforcing rib 39 extends transversely to plate 32 from the foot of a base 35 of a tab 34 to the foot of the base 35 of the other tab 34.

On its opposite surface to shank 30, the circular plate 31 comprises a rectilinear cut-out 33 adapted to receive the end of the shaft of a tool enabling the fixing foot 2 to undergo a rotation about its main axis.

The article presents an unlocked configuration represented in FIGS. 3 to 6 and a locked configuration represented in FIGS. 7 to 9.

In the unlocked position of the article, the foot 2 is disposed in the aperture 14 which passes through part 1 with plate 31 being situated in plate 4 such that its surface comprising the cut-out 33 is flush with the outer surface 7. The oblong plate 32 is situated at the re-entrant portion between the first portion of the aperture 14 and its second portion. The oblong plate is in contact with the edges 21 of the snap-fastening lugs 22 and the wedges 36 projecting from the body 5 with the re-entrant portions adjacent to the wedges 36 which arrive to cooperate with the free surface of the back wall 16 of the body 5.

In this configuration, the ramps of the wedges 36 are transversely disposed to the ramps of the lugs 20 that is to say that there is an angular alternation of the lugs 20 and the wedges 36 around the main axis of the article.

In this configuration, one of the lateral walls of one of the wedges 36 is disposed against one of the lateral walls of the projection 23.

In the locked configuration, the foot 2 is disposed in the same way in part 1 as in the unlocked position except that it has undergone a rotation through a quarter turn about its main axis. It is then the lateral face of the other wedge 36 which comes against a face of the projection 23.

The tabs 34 are now each disposed as if to form an extension of a lug 20. As the oblong plate 32 has also turned through a quarter turn, the portions that project the most are located against the edges 21 of the lugs 20. The lugs 20 are slightly flexible. They have a resting position in which they are spaced apart from each other. They also have a locking position in which the distance which separates their edges 21 is slightly greater than in their resting position.

The lugs 20 are in their locking position and are held apart in that position by the oblong plate 32 of which the greatest distance corresponds to the separation between the edges 21 in that locking position. This distance is greater than the diameter of the aperture 14. In locked configuration, the lugs 20 are held in their locked position by friction of the oblong plate 31 against the snap-fastening lugs 20.

The cut-out 33 is transversely disposed to the fastening lugs 20.

The assembly operations are now described. First of all the foot 2 is inserted into the aperture 14 of part 1 such that the article is in its unlocked configuration. This configuration corresponds to the configuration in which a handle bearing the article described is delivered so as then to be positioned on the sheet metal of a vehicle.

Part 1 provided with the foot 2 is then snap-fastened onto the sheet metal 40 of a vehicle.

The sheet metal 40 is provided with an opening 41 of which the dimensions correspond to the rectangular space occupied by the lateral walls 15.

The article is then pushed in until the periphery of the opening 41 on the sheet metal 40 is in contact with the region 22 of increased thickness. The two portions of the region 22 of increased thickness in contact with the periphery of the opening 41 form the two abutment means for bearing against the support. The edges 21 of the snap-fastening lugs 20 are then disposed in the space left free by the opening 41. The distance between the edges 21 and the region of increased thickness 22 is slightly greater than the thickness of the sheet metal 40.

Locking is then carried out by passing from the unlocked configuration to the locked configuration using a tool comprising a shaft of which the free end fits the cut-out 33 and by rotating the foot 2 through a quarter of a turn. The snap-fastening lugs 20 then move apart from each other and the edges 21 come into position against the periphery of the opening 41 such that the sheet metal 40 is sandwiched between the region 22 of increased thickness and the edges 21 of the snap-fastening lugs 20.

In this configuration, the article is fixed and locked onto the sheet metal 40.

For the fixing and the locking of an assist grip handle of an automotive vehicle, a handle segment 12 is mounted onto two articles, and the fixing feet 2 are inserted into each of the apertures 14 of the parts 1 so as to arrive at the unlocked configuration. The locking is proceeded with as described earlier.

To remove the article, or the handle, from the sheet metal of the automotive vehicle, it suffices to make the fixing foot perform a quarter turn using the tool mentioned earlier to return to the unlocked position, the edges 21 then no longer resisting the extraction of the article out of the opening 41 in the sheet metal 40.

Foot 2 may also be removed from part 1 by pinching the wedges 36 and by pushing on the foot 2, via those wedges 36, which is then pushed out from part 1.

According to a variant of the embodiment, the orientation of the tabs and of the oblong plate relative to each other is different, the plate being turned through 90°.

According to another embodiment of the invention, the article is used for fixing a member other than a handle to the sheet metal, for example a hook.

The invention claimed is:
1. A fastener assembly, comprising:
   a first component comprising
      a pair of side walls bounding an opening;
      a back wall extending between said pair of side walls;
      an aperture disposed within said back wall;
      a pair of fastening lugs each having a first end an a second end attached to said back wall;
      an abutment disposed on and extending outwardly from said back wall;
   a second component comprising
      a shank having a first end and an opposing second end;
      a first plate attached to said first end;
      an oblong plate attached to said second end;
      a pair of fastening tabs extending transversely from said oblong plate and spaced apart and dimensioned and configured to be inserted within said opening and said aperture.

2. A fastener assembly according to claim 1, wherein each said snap-fastening lug is flexible and comprises a ramp and a reentrant portion disposed at the end of said ramp.

3. A fastener assembly according to claim 2, wherein the back wall is planar.

4. A fastener assembly according to claim 1, wherein said first plate is circular having a diameter, wherein the largest dimension of said second oblong plate is equal to the diameter of said first plate and matches the diameter of said aperture on the opposite side to said lugs.

5. A fastener assembly according to claim 1, said first plate comprises a cut-out adapted to receive a tool for rotation of said foot.

6. A fastener assembly according to claim 1, wherein said first component further comprises a plate, and a a handle base comprising hinging and mounting support for a segment of a handle.

7. An assist grip handle for an automotive vehicle, comprising two said fasteners according claim 1 as well as a handle segment of which the two ends are each hingingly mounted on a respective fastener.

8. The fastener assembly of claim 1, wherein in a first unlocked configuration said oblong plate is laterally disposed between said fastening snap lugs, and the ramps are inserted through the aperture of the first component.

9. The fastener assembly of claim 8, wherein in the second locked configuration, the second component is rotated a quarter turn, wherein longer sides of the oblong plate pushes out the fastening lugs and the lateral face of the fastening tab engages said abutment at end of the quarter turn, thereby resulted in the locked and secured position of the first component within an aperture of a part.

\* \* \* \* \*